United States Patent
Lo et al.

(10) Patent No.: US 9,817,209 B1
(45) Date of Patent: Nov. 14, 2017

(54) MIRROR ASSEMBLY

(71) Applicant: CAL-COMP BIG DATA, INC., New Taipei (TW)

(72) Inventors: Teng-Nan Lo, New Taipei (TW); Hsin-Ju Kuo, New Taipei (TW); Cheng-Chih Hsu, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 15/398,722

(22) Filed: Jan. 5, 2017

(30) Foreign Application Priority Data

Nov. 29, 2016 (TW) .............................. 105218215 U

(51) Int. Cl.
  *G02B 7/182* (2006.01)
(52) U.S. Cl.
  CPC ................... *G02B 7/182* (2013.01)
(58) Field of Classification Search
  CPC ..................................................... G02B 7/182
  USPC ................ 359/850, 854, 855, 865, 903, 467
  See application file for complete search history.

(56) References Cited

U.S. PATENT DOCUMENTS

| | | | | |
|---|---|---|---|---|
| 518,382 A * | 4/1894 | Wiederer | ............... | A45D 42/18 359/854 |
| 1,088,764 A * | 3/1914 | Booth | .................... | B60R 1/081 359/854 |
| 1,451,236 A * | 4/1923 | Stanfield | ................ | A45D 42/18 248/466 |
| 2,140,069 A * | 12/1938 | Bostwick | ............... | A45D 42/00 292/256.73 |
| 2,201,251 A * | 5/1940 | Van Patten | ............ | A45D 42/10 359/854 |
| 6,007,206 A * | 12/1999 | Chang | ..................... | A45D 42/00 359/850 |
| 6,322,222 B1 * | 11/2001 | Kobayashi | ............... | G02B 5/08 248/467 |
| 6,347,876 B1 * | 2/2002 | Burton | ................... | A45D 42/10 362/141 |
| 6,926,416 B2 * | 8/2005 | Sawyer | ................... | B60R 1/081 248/467 |
| 2004/0156133 A1 * | 8/2004 | Vernon | .................. | A45D 42/18 359/866 |

* cited by examiner

Primary Examiner — Ricky D Shafer
(74) Attorney, Agent, or Firm — JCIPRNET

(57) ABSTRACT

A mirror assembly including a base, a first mirror, at least one first magnetic component, at least one second magnetic component, at least one supporting frame, and at least one second mirror is provided. The base has a first recess, a side wall portion surrounding the first recess, and at least one second recess located on the side wall portion. The first mirror is disposed on the base and covers the first recess. The first magnetic component is disposed on the side wall portion and corresponding to the second recess, and is located in the first recess. The second magnetic component is inserted into the second recess, and the first magnetic component and the second magnetic component attract each other. The supporting frame is pivoted to the second magnetic component so as to rotate relative to the base. The second mirror is disposed on the supporting frame.

7 Claims, 6 Drawing Sheets ial no. 105218215, filed on Nov. 29, 2016.
MIRROR ASSEMBLY

CROSS-REFERENCE TO RELATED APPLICATION

This application claims the priority benefit of Taiwan application serial no. 105218215, filed on Nov. 29, 2016. The entirety of the above-mentioned patent application is hereby incorporated by reference herein and made a part of this specification.

BACKGROUND OF THE INVENTION

Field of the Invention

The disclosure relates to a minor assembly, and particularly relates to a mirror assembly convenient in assembly and disassembly.

Description of Related Art

A conventional minor assembly includes a primary minor and at least one side mirror pivotally connected to the primary mirror, wherein the primary minor and the side minor are pivoted to each other through a fixed pin, so it is inconvenient for the user in assembly or disassembly.

SUMMARY OF THE INVENTION

The disclosure provides a mirror assembly with excellent convenience in use.

The disclosure proposes a mirror assembly including a base, a first mirror, at least one first magnetic component, at least one second magnetic component, at least one supporting frame, and at least one second mirror. The base has a first recess, a side wall portion surrounding the first recess, and at least one second recess located on the side wall portion. The first mirror is disposed on the base and covers the first recess. The first magnetic component is disposed on the side wall portion and corresponding to the second recess, and is located in the first recess. The second magnetic component is inserted into the second recess, and the first magnetic component and the second magnetic component attract each other. The supporting frame is pivoted to the second magnetic component so as to rotate relative to the base. The second mirror is disposed on the supporting frame.

In one embodiment of the disclosure, the base further has at least one carrying portion located in the first recess. The carrying portion protrudes from the side wall portion and is corresponding to the second recess, and the first magnetic component is disposed on the carrying portion.

In one embodiment of the disclosure, an opening of the first recess and an opening of the second recess face toward opposite directions.

In one embodiment of the disclosure, the first magnetic component and the second magnetic component are two magnetic members.

In one embodiment of the disclosure, one of the first magnetic component and the second magnetic component is a magnetic member, and another one of the first magnetic component and the second magnetic component is a paramagnetic member or a ferromagnetic member.

In one embodiment of the disclosure, the mirror assembly further includes at least one pin, the supporting frame is pivotally connected to the second magnetic component through the pin.

In one embodiment of the disclosure, the supporting frame includes a plate, an extending portion connected to the plate, and a pivot portion connected to the extending portion. The second mirror is disposed on the plate, the extending portion is located between the plate and the pivot portion, and the pivot portion is pivotally connected to the second magnetic component.

Based on the above, the mirror assembly of the disclosure includes a first minor and at least one second mirror, wherein the first mirror can serve as a primary minor, the second mirror can serve as a side mirror, and the side mirror is detachably pivoted to the primary mirror so that it is inconvenient for the user in assembly or disassembly.

In order to make the aforementioned and other features and advantages of the disclosure comprehensible, several exemplary embodiments accompanied with figures are described in detail below.

DESCRIPTION OF THE EMBODIMENTS

Figure 1:
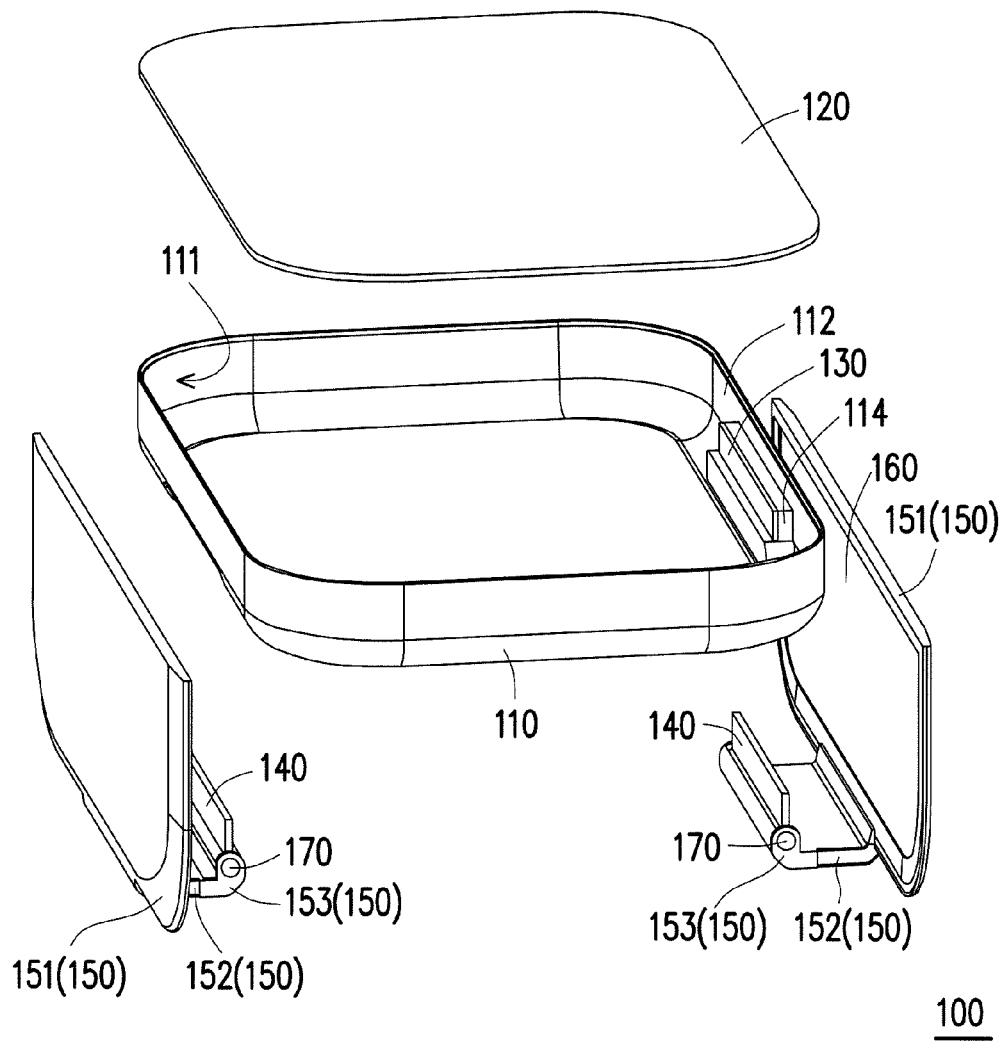
FIG. 1 is an exploded schematic view of a minor assembly according to one embodiment of the disclosure.
Figure 2:
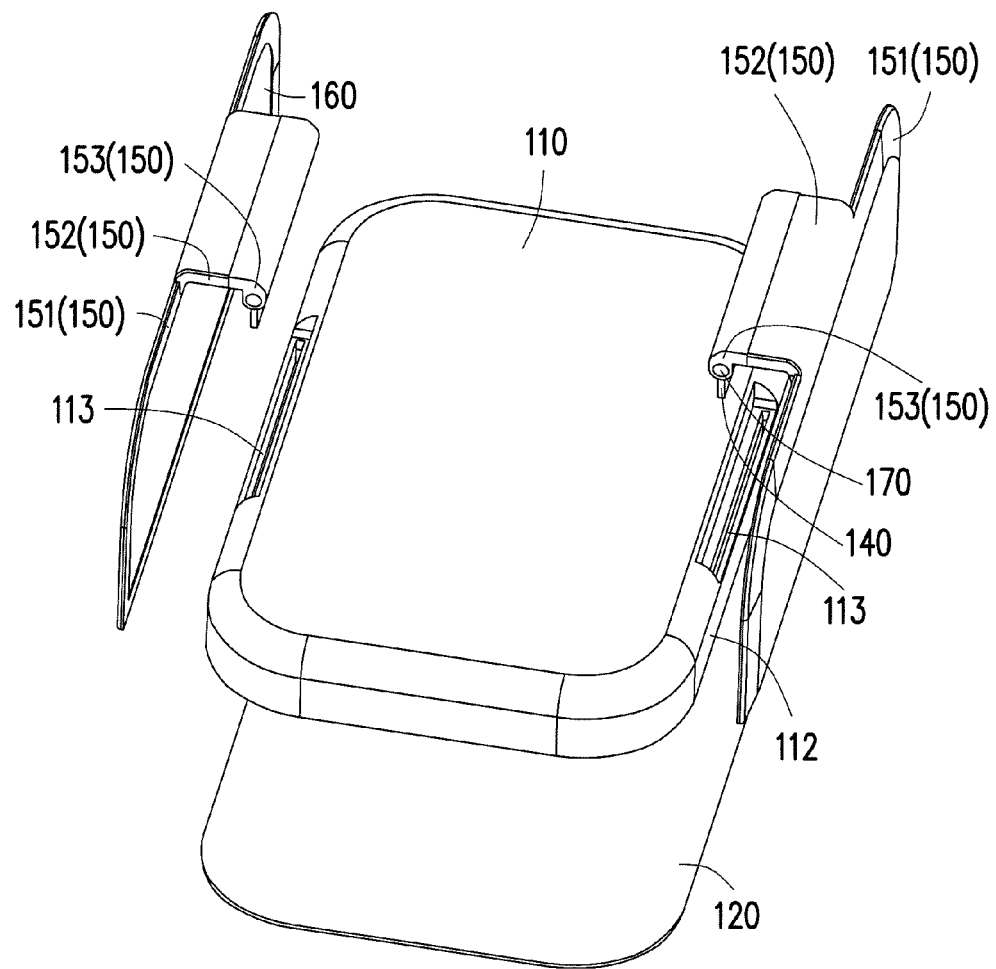
FIG. 2 is an exploded schematic view at another angle of a minor assembly according to one embodiment of the disclosure.
Figure 3A:
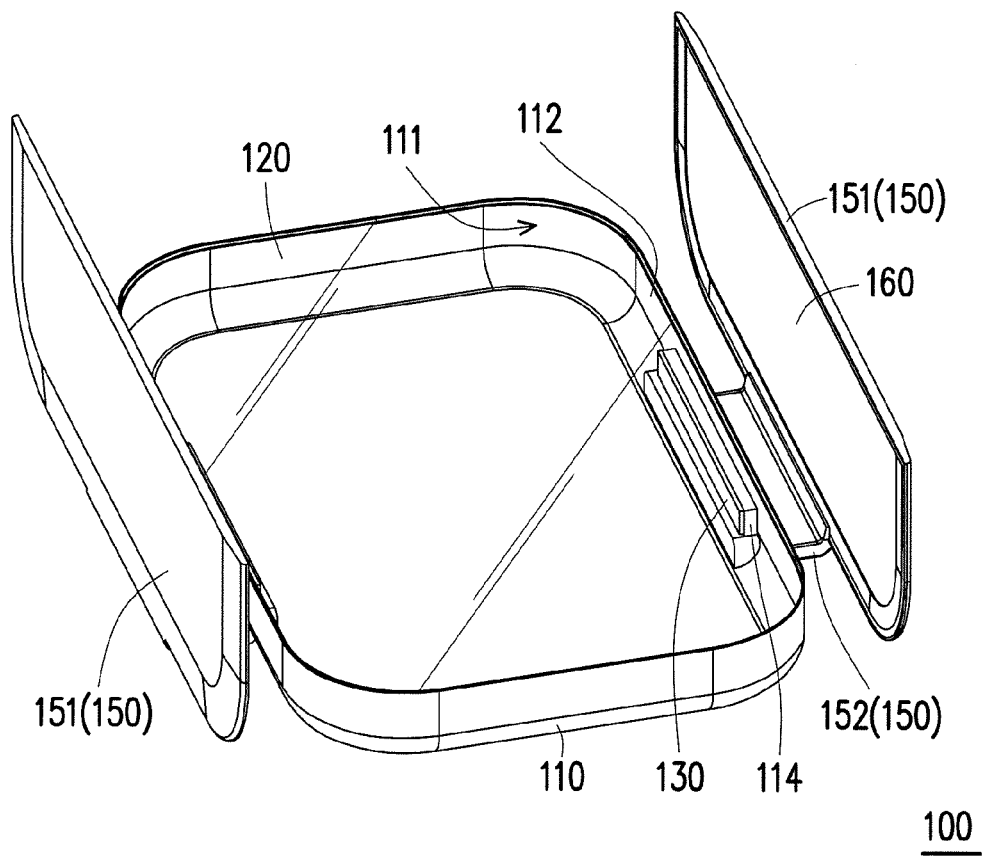
FIG. 3A is a schematic view of a minor assembly in expanded state according to one embodiment of the disclosure.
Figure 3B:
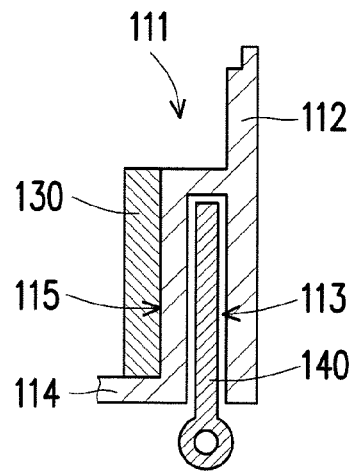
FIG. 3B is a partial cross-sectional schematic view of a first magnetic component and a second magnetic component inserted into a second recess according to one embodiment of the disclosure.
Figure 4:
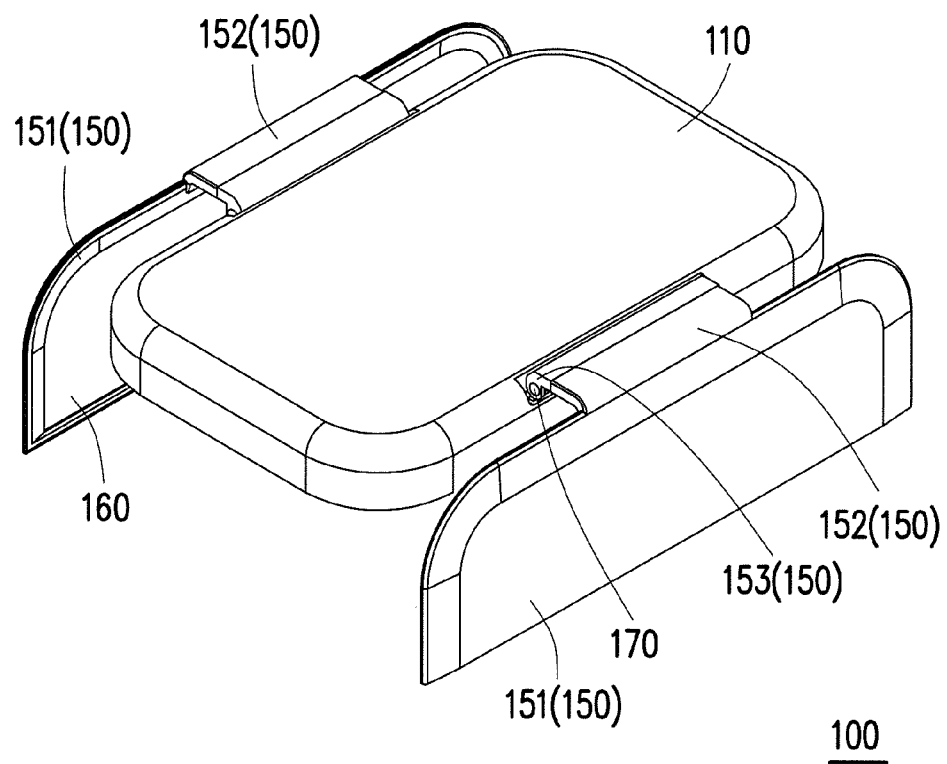
FIG. 4 is a schematic view at another angle of a mirror assembly in expanded state according to one embodiment of the disclosure.

FIG. 1 is an exploded schematic view of a mirror assembly according to one embodiment of the disclosure. FIG. 2 is an exploded schematic view at another angle of a mirror assembly according to one embodiment of the disclosure. FIG. 3A is a schematic view of a mirror assembly in expanded state according to one embodiment of the disclosure. FIG. 3B is a partial cross-sectional schematic view of a first magnetic component and a second magnetic component inserted into a second recess according to one embodiment of the disclosure. FIG. 4 is a schematic view at another angle of a mirror assembly in expanded state according to one embodiment of the disclosure. For clarity and ease of explanation, a first mirror 120 is depicted as transparent in FIG. 3A. Referring to FIGS. 1-4, in the present embodiment, a mirror assembly 100 includes a base 110, the first mirror 120, at least one first magnetic component 130, at least one second magnetic component 140, at least one supporting frame 150, and at least one second mirror 160. The first mirror 120 is disposed on the base 100, the supporting frame 150 is pivotally connected to the base 110, and the second mirror 160 is disposed on the supporting frame 150.

More specifically, the base 110 has a first recess 111, a side wall portion 112 surrounding the first recess 111, and at least one second recess 113 located on the side wall portion 112. In addition, an opening of the first recess 111 is covered by the first mirror 120, the opening of the first recess 111 and an opening of the second recess 113 face toward opposite directions, and the first recess 111 and the second recess 113 are separated by the side wall portion 112. The number of the first magnetic components 130, the number of the second magnetic components 140, the number of the supporting frames 150, the number of second mirrors 160, and the number of the second recess 113 are equal to each other. In the present embodiment, two supporting frames 150 are provided in a pair for illustration as an example, two second mirrors 160 are respectively disposed on the two supporting frames 150. Therefore, each of the number of the first magnetic component 130, the number of the second magnetic component 140, and the number of the second recess 113 is equal to two. It should be noted here, because of the viewing angle, some components are not shown in the drawings. On the other hand, the number of the second mirrors on the supporting frames is not limited in the disclosure. In other embodiments, the number of the second mirrors on the supporting frames can also be equal to one or greater than two, the number of the first magnetic components, the number of the second magnetic components, the number of the second recesses corresponding to the number of second mirrors on the supporting frames are adjusted accordingly.

The first magnetic component 130 is disposed on the side wall portion 112 and corresponding to the second recess 113, and the first magnetic component 130 is located in the first recess 111. In the present embodiment, the base 110 may have at least one carrying portion 114 located in the first recess 111, and the number of the carrying portions 114 is equal to the number of the first magnetic components 130. The carrying portion 114 protrudes from the side wall portion 112 and is corresponding to the second recess 113, and the first magnetic component 130 is disposed on the carrying portion 114. Furthermore, the carrying portion 114 has a side surface 115 perpendicular to the bottom of the first recess 111, and the first magnetic component 130 is bonded with the side surface 115. On the other hand, the second magnetic component 140 is inserted into the second recess 113, and the first magnetic component 130 and the second magnetic component 140 may be two magnetic remembers (such as magnet), and the opposing surfaces with different magnetic properties of the first magnetic component 130 and the second magnetic component 140 attract each other, so that the second magnetic component 140 is fixed into the second recess 113. In other embodiments, one of the first magnetic component and the second magnetic component may be a magnetic member (such as a magnet), and another one of the first magnetic component and the second magnetic component may be a paramagnetic member or a ferromagnetic member.

In other words, the second magnetic component 140 inserted into the second recess 113 may be fixed to the base 110 by magnetic attraction. In the present embodiment, the supporting frame 150 is pivoted to the second magnetic component 140 so as to rotate relative to the base 110. Since the supporting frame 150 is connected to the base 110 through the second magnetic component 140, the supporting frame 150 is separated from the base 110 by removing the second magnetic component 140 from the second recess 113. Hence, it is convenient to detach the supporting frame 150 and the base 110 from each other and so that it is inconvenient for the user in assembly or disassembly. FIG. 3A and FIG. 4 depict the supporting frame 150 in an expanded state after rotating relative to the base 110, at this time, the first mirror 120 serving as the primary mirror and the second mirror 160 serving as the side mirror are exposed, so that the user can view the image mapped out by the primary minor and the side mirror. More specifically, the supporting frame 150 includes a plate 151, an extending portion 152 connected to the plate 151, and a pivot portion 153 connected to the extending portion 152. In addition, the second minor 160 is disposed on the plate 151, the extending portion 152 is located between the plate 151 and the pivot portion 153, and the pivot portion 153 is pivotally connected to the second magnetic component 140. With no structural interference and within the angle range of rotation of the supporting frame 150 relative to the base 110, in the rotation between the expanded state and the closed state, the extending portion 152 and the plate 151 may form an acute angle, an obtuse angle, or a right angle.

In the present embodiment, the mirror assembly further includes at least one pin 170, the number of the pins 170 may be equal to the number of the supporting frames 150 or is two times greater than the number of the supporting frames 150, and the pivot portion 153 of the supporting frame 150 is pivotally connected to the second magnetic component 140 through the pin 170.

Figure 5:
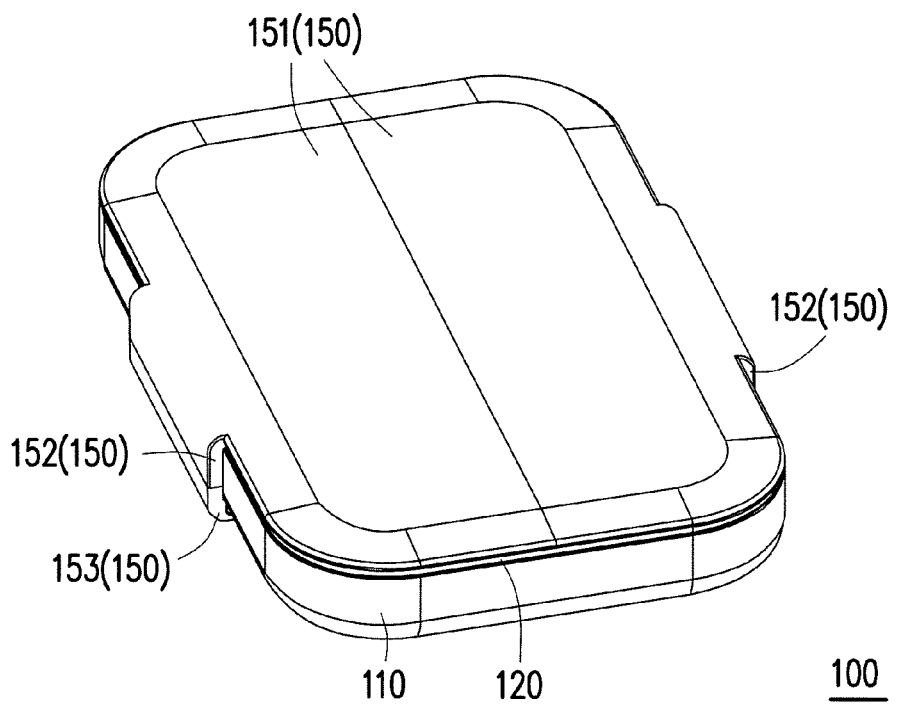
FIG. 5 is a schematic view of a mirror assembly in closed state according to one embodiment of the disclosure.
Figure 6:
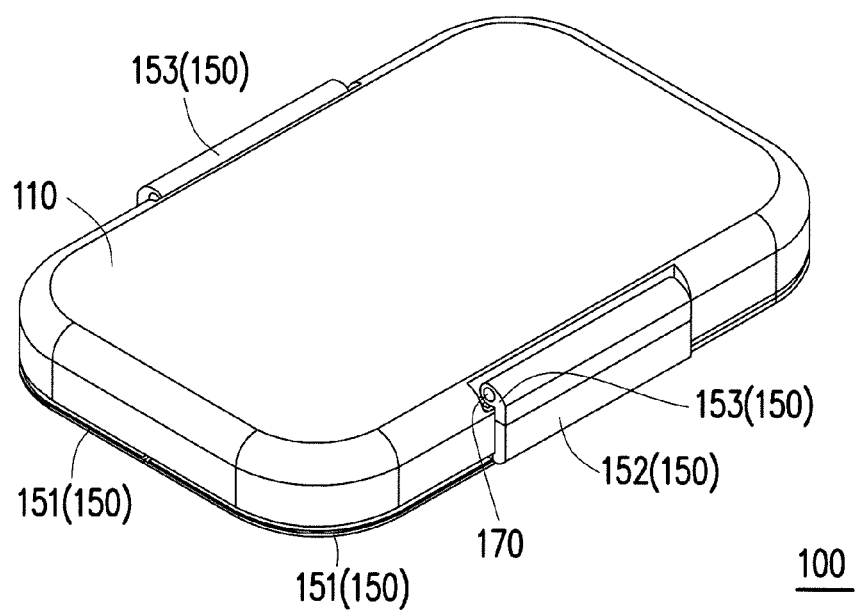
FIG. 6 is a schematic view at another angle of a mirror assembly in closed state according to one embodiment of the disclosure.

FIG. 5 is a schematic view of a mirror assembly in closed state according to one embodiment of the disclosure. FIG. 6 is a schematic view at another angle of a mirror assembly in closed state according to one embodiment of the disclosure. Referring to FIGS. 5-6, the supporting frame 150 is rotated relative to the base 110 so that the mirror assembly 100 is transformed from the expanded state to the closed state. In the closed state, the plate 151 and the second mirror 160 disposed thereon may be parallel to or slightly inclined to the first mirror 120, so as to cover the first mirror 120.

Figure 7:
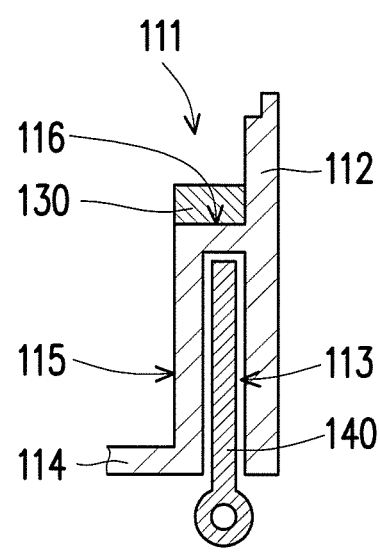
FIG. 7 is a partial cross-sectional schematic view of a first magnetic component and a second magnetic component inserted into a second recess according to another embodiment of the disclosure.

FIG. 7 is a partial cross-sectional schematic view of a first magnetic component and a second magnetic component inserted into a second recess according to another embodiment of the disclosure. Referring to FIG. 7, the carrying portion 114 has a side surface 116 perpendicular to the side surface 115, and the first magnetic component 130 is bonded with the side surface 116. It should be noted here, as long as the magnetic attraction is exploited between the first magnetic component 130 and the second magnetic component 140 inserted into the second recess 113, the position of the first magnetic component 130 is not limited in the disclosure.

Based on the above, the mirror assembly of the disclosure includes a first mirror and at least one second mirror, wherein the first mirror can serve as the primary mirror and the second mirror can serve as the side mirror. The base that the primary mirror is disposed on is configured to have the first magnetic component, the supporting frame that the side mirror is disposed on and the second magnetic component are pivotally connected to each other. The second magnetic component is inserted into the base, and the first magnetic component and the second magnetic component attract each other so as to connect the supporting frame with the base. Because the supporting frame is connected to the base through the second magnetic component and the supporting frame and the second magnetic component are pivotally connected to each other, a degree of freedom which is the relative rotation between the supporting frame and the base is still retained. On the other hand, the supporting frame is separated from the base by removing the second magnetic component from the base. In other words, it is inconvenient for the user to assemble or disassemble the mirror assembly in the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A mirror assembly, comprising:
   a base, having a first recess, a side wall portion surrounding the first recess, and at least one second recess located on the side wall portion;
   a first mirror, disposed on the base and covering the first recess;
   at least one first magnetic component, disposed on the side wall portion and corresponding to the second recess, and located in the first recess;
   at least one second magnetic component, inserted into the second recess, and the first magnetic component and the second magnetic component attracting each other;
   at least one supporting frame, pivoted to the second magnetic component so as to rotate relative to the base; and
   at least one second mirror, disposed on the supporting frame.

2. The mirror assembly as recited in claim 1, wherein the base further has at least one carrying portion located in the first recess, the carrying portion protrudes from the side wall portion and is corresponding to the second recess, and the first magnetic component is disposed on the carrying portion.

3. The mirror assembly as recited in claim 1, wherein an opening of the first recess and an opening of the second recess face toward opposite directions.

4. The mirror assembly as recited in claim 1, wherein the first magnetic component and the second magnetic component are two magnetic members.

5. The mirror assembly as recited in claim 1, wherein one of the first magnetic component and the second magnetic component is a magnetic member, and another one of the first magnetic component and the second magnetic component is a paramagnetic member or a ferromagnetic member.

6. The mirror assembly as recited in claim 1, further comprising:
   at least one pin, the supporting frame being pivotally connected to the second magnetic component through the pin.

7. The mirror assembly as recited in claim 1, wherein the supporting frame comprises a plate, an extending portion connected to the plate, and a pivot portion connected to the extending portion, the second mirror is disposed on the plate, the extending portion is located between the plate and the pivot portion, and the pivot portion is pivotally connected to the second magnetic component.

* * * * *